L. W. NIED.
PLANT SUPPORT.
APPLICATION FILED SEPT. 22, 1909.

959,789.

Patented May 31, 1910.

Witnesses:

INVENTOR-
Lewis W. Nied,
BY
ATTORNEY.

UNITED STATES PATENT OFFICE.

LEWIS W. NIED, OF AKRON, OHIO.

PLANT-SUPPORT.

959,789.    Specification of Letters Patent.    Patented May 31, 1910.

Application filed September 22, 1909.   Serial No. 519,000.

*To all whom it may concern:*

Be it known that I, LEWIS WILLIAM NIED, a citizen of the United States, residing at Akron, in the county of Summit and State of Ohio, have invented new and useful Improvements in Plant-Supports, of which the following is a specification.

This invention relates to devices for supporting growing plants and is especially designed for use in connection with such plants as chrysanthemums, carnations, etc., and the object thereof is to provide a strong, safe and substantially indestructible supporting device of the general type named.

A further object of this invention is to so construct the device that it may be readily and cheaply manufactured and composed of a material which is substantially indestructible and which may be dismantled when not in use and readily and conveniently packed for shipment.

The invention further contemplates providing a standard to which lateral supports may be added as needed to properly support the growing plant.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
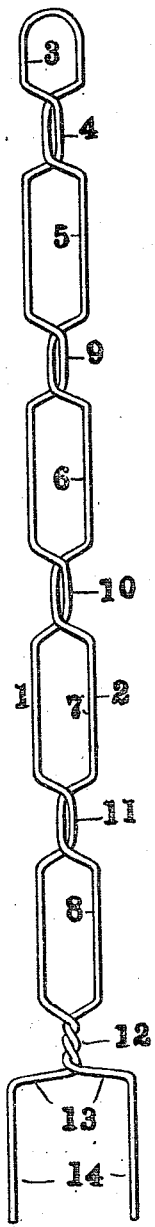
Figure 2:
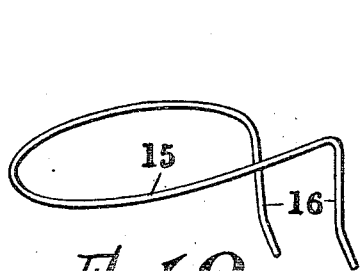
Figure 3:
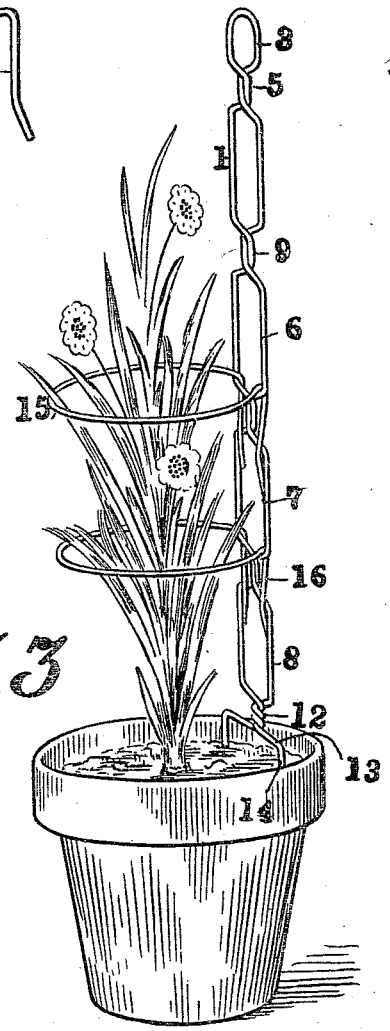

In the drawings, in which similar reference numerals indicate like parts in the different figures: Figure 1 is a view in front elevation of the standard. Fig. 2 is a perspective view of one of the lateral members used to sustain and support the growing plant; and, Fig. 3 is a perspective view of a device embodying this invention, in use.

The device is preferably formed of wire of such size as to provide sufficient strength and yet not render the device excessively heavy.

The standard is preferably formed of a continuous wire bent upon itself so that the device is formed of two lateral wires 1 and 2. These wires are preferably formed into a loop 3 at the top of the standard, below which the wires are wrapped or twisted one or more times about each other at 4, below which the wires are fashioned into a series of loops 5, 6, 7 and 8, and between and alternating with the loops the wires are wrapped spirally about each other at 9, 10 and 11 in the same manner as at 4. Below the bottom loop 8 the wrappings of the wires 1 and 2 about each other form a spiral stem 12, below which the wires are bent laterally to form projecting arms 13 and thence downwardly constituting prongs 14 which are inserted in the earth adjacent to the growing plant for the purpose of holding the device upright.

The lateral or supporting members which serve to sustain the plants each comprise a broken loop of wire 15 with the separated ends 16 thereof brought into juxtaposition and then bent downwardly approximately parallel with each other. These supporting members are secured in position by inserting the parallel ends 16 through one of the loops, for instance 6 as shown in Fig. 1, and springing them backward against the upper portion of the next lower loop 7. The loops are all preferably, although not necessarily, of the same diameter and are large enough to permit free movement of the growing plant and thus prevent the latter from being broken.

It will be obvious that when it is desired to ship these devices a number of the standards may be closely packed toegther, thus insuring great economy of space, while at the same time the supporting or lateral members may be nested together to prevent their taking up too much room.

After being used on one plant the devices may be removed and used on another one and as they are generally made of wire they are substantially indestructible and it is also apparent that they will not necessarily have to be dismantled after being used as they remain locked together by the spring action of the parallel ends 16 of the loops 15 which are interlocked with the loops of the standard.

I claim:

1. A plant support comprising a standard formed of upright lateral spaced wires, said wires at intervals being inwardly-bent and engaging each other, the portions of said wires between the engaging portions thereof formed into loops, the lower ends of said wires being downwardly-bent to constitute prongs capable of being inserted in the earth for supporting said standard and a detachable supporting member comprising a broken loop having downwardly-turned juxtapositioned parallel ends, the latter adapted to be passed into one of said loops of said standard and sprung against and extending below the upper portion of the next lower loop.

2. A plant support comprising a standard formed of upright lateral spaced wires, said wires at intervals being inwardly-bent and engaging each other, the portions of said wires between the engaging portions thereof formed into loops, the lateral portions of said loop being approximately parallel, the lower ends of said wires being downwardly-bent to constitute prongs capable of being inserted in the earth for supporting said standard and a detachable supporting member comprising a broken loop having downwardly-turned juxtapositioned parallel ends, the latter adapted to be passed into one of said loops of said standard and sprung against and extending below the upper portion of the next lower loop, the lower ends of said arms being bent to interlock with the lower loop.

In testimony whereof I have hereunto set my hand in presence of two subscribing witnesses.

LEWIS W. NIED.

Witnesses:
GLENARA FOX,
C. E. HUMPHREY.